Aug. 28, 1962     D. HALPERIN     3,051,503
ICE CONVERSION UNIT FOR BOAT TRAILERS
Filed Sept. 8, 1959     2 Sheets-Sheet 1
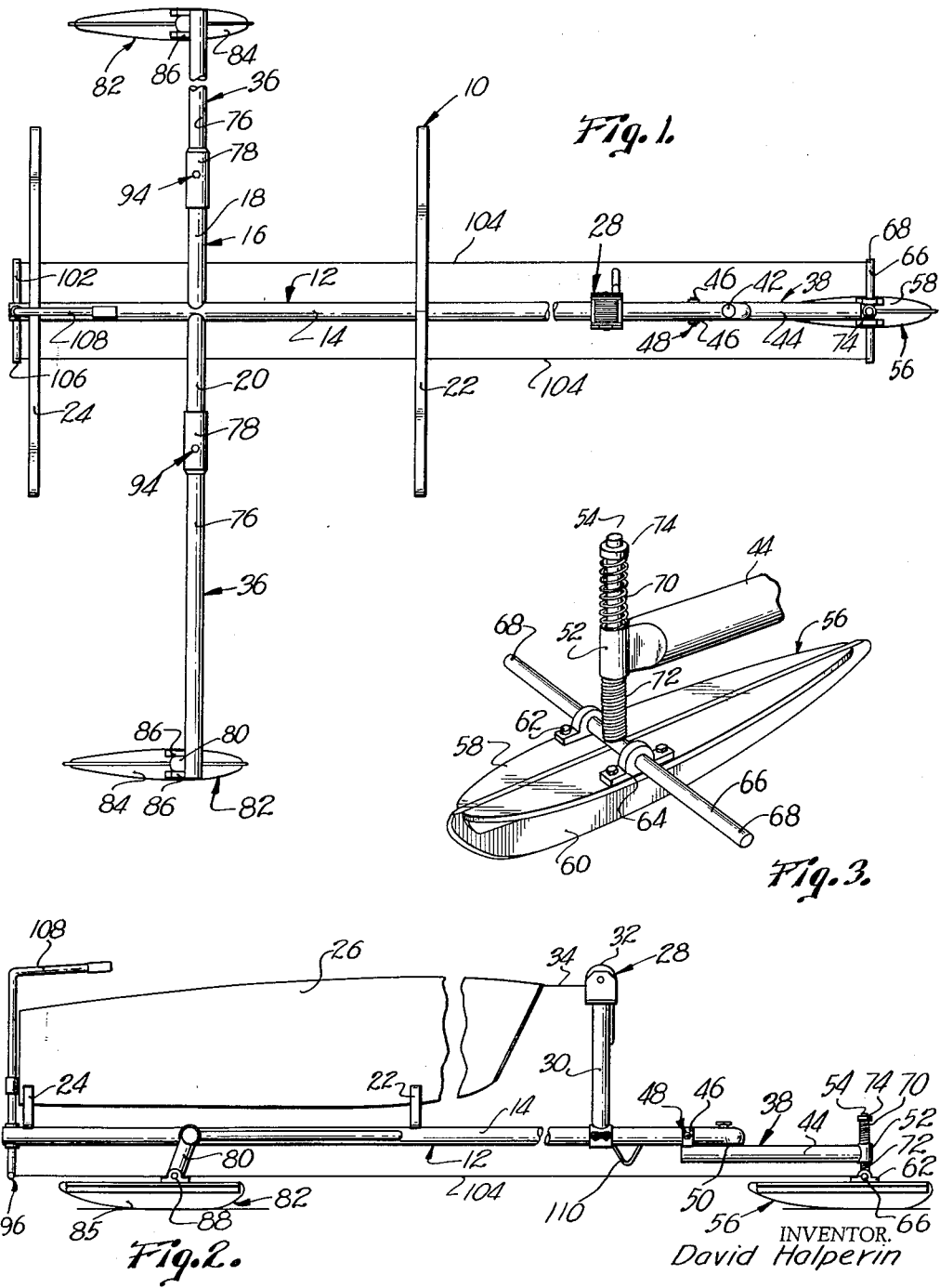
INVENTOR.
David Halperin
BY
*Harvey, Schmidt, Johnson & Hovey*
ATTORNEYS.

Aug. 28, 1962          D. HALPERIN          3,051,503
ICE CONVERSION UNIT FOR BOAT TRAILERS
Filed Sept. 8, 1959          2 Sheets-Sheet 2
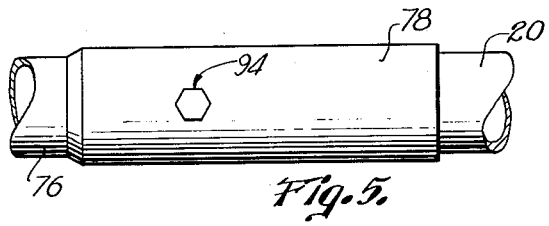
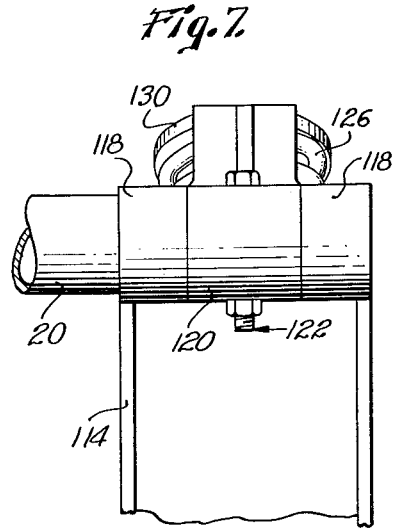
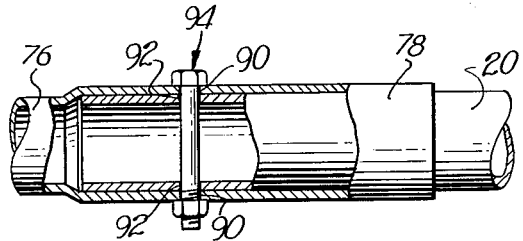
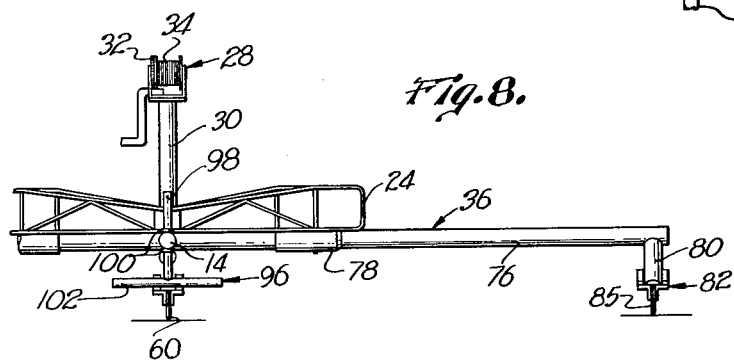
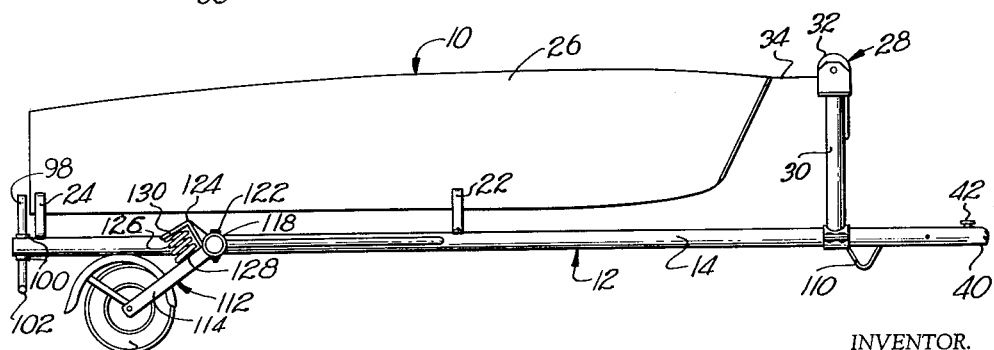
INVENTOR.
David Halperin
BY
Hovey, Schmidt, Johnson & Hovey
ATTORNEYS.

United States Patent Office 3,051,503
Patented Aug. 28, 1962

3,051,503
ICE CONVERSION UNIT FOR BOAT TRAILERS
David Halperin, Shawnee, Kans., assignor to Catamaran Corporation of America, Kansas City, Mo., a corporation of Missouri
Filed Sept. 8, 1959, Ser. No. 838,787
5 Claims. (Cl. 280—16)

This invention relates to a mobile unit in the nature of a boat trailer and more specifically, to novel structure permitting conversion of the trailer for use as an ice boat on the frozen surface of a body of water.

It is an important object of the invention to provide a mobile unit presenting a trailer for transporting of a small boat such as those popularly known as the outboard type over the ground, and yet which may be quickly and easily converted to a condition whereby the unit may be used on ice and with the boat remaining in place on the frame assembly of the trailer.

It is a further important object of the present invention to provide a convertible mobile unit as described above wherein the trailer may be converted to ice boat use by the simple expedient of substituting skates for respective wheel and axle structures of the trailer, and providing a steering skate secured to the tongue means of the trailer frame assembly.

Also an important object of the invention is to provide a mobile unit adapted for utilization as an ice boat having novel means thereon for permitting steering of the front skate connected to the trailer frame assembly, from a position within and at the rearmost end of the boat fixedly mounted on the frame assembly in a predetermined position.

It is another important object of the invention to provide a mobile unit wherein the components which engage the ground, and which may be either wheels or skates depending upon the use to which the unit is placed, are constructed to compensate for irregularities in the surface over which the unit is moving to thereby prevent deleterious stresses and strains from being imparted to the boat supported by the frame assembly of the convertible trailer.

Other important objects and details of construction of the present mobile unit will become obvious or be explained in greater detail as the following specification progresses.

In the drawings:

FIGURE 1 is a plan view of the present mobile unit illustrating the same when adapted for utilization on ice, and with the boat normally supported thereby, removed to illustrate the details of the frame assembly;

FIG. 2 is a side elevational view of the mobile unit adapted for utilization on ice and in this instance, illustrating the boat in its normal position on the frame assembly;

FIG. 3 is an enlarged, fragmentary, perspective view of the front steering skate forming a part of the mobile unit when utilized as an ice boat;

FIG. 4 is a side elevational view similar to FIG. 2 and illustrating the present mobile unit when the same is in the form of a trailer for transporting a boat supported thereby;

FIG. 5 is an enlarged, fragmentary, plan view of the means providing interconnection between one of the side skate components of the mobile unit when employed as an ice boat;

FIG. 6 is an enlarged, fragmentary, side elevational view of the coupling illustrated in FIG. 5, with portions of the parts thereof being broken away and in section to reveal details of construction of the same;

FIG. 7 is an enlarged, fragmentary, detail view of the parts providing interconnection between one of the wheel and axle assemblies and a cross member of the frame assembly of the unit when the latter is employed as a boat trailer; and FIG. 8 is a fragmentary, rear elevational view of the unit as shown in FIG. 1.

The present mobile unit and broadly designated 10 is illustrated in FIGS. 1 to 3 inclusive, 5, 6 and 8, in the condition thereof adapting the same to be employed as an ice boat. The basic frame assembly 12 of unit 10 and which is unchanged when the latter is used either as an ice boat or as a trailer for transporting a boat, preferably comprises an elongated main tubular member 14 parallel with the normal path of travel of unit 10, as well as a substantially shorter, tubular cross member 16, perpendicular to main member 14 and which may be constructed of a pair of identical, tubular members 18 and 20 welded to and extending outwardly from main member 14, and of equal length as illustrated in FIG. 1. If desired, additional bracing (not shown) may be provided between main member 14 and respective side members 18 and 20 to reinforce the same. Main member 14 also carries a pair of upright, horizontally spaced, hull receiving frames 22 and 24 disposed in perpendicular relationship to the longitudinal length of main member 14 and adapted to receive a boat preferably of the outboard type such as 26, and in suitable supporting relationship thereto. Any suitable means may be employed for releasably securing boat 26 to respective frames 22 and 24, and it is preferred that the latter contain rollers to facilitate removal and emplacement of boat 26 upon secondary frames 22 and 24 through utilization of winch means broadly numerated 28. As indicated in FIGS. 1, 2 and 4, winch means 28 includes a standard 30 rigidly connected to main member 14 adjacent the normally forwardmost end thereof and carrying a windlass 32 at the uppermost end thereof having a cable 34 trained thereover and adapted to be connected to the bow of boat 26.

Means for supporting frame assembly 12 for utilization on ice, comprises a pair of identical side skate components 36, releasably connected to respective outer ends of side members 18 and 20, as well as a front steering skate component 38. As will be explained in greater detail hereinafter, the forwardmost end of main member 14 comprises tongue means permitting frame assembly 12 to be releasably connected to a towing hitch and thus the outer end of main member 14 has a hitch-ball receiving socket 40 in the forwardmost end of main member 14, with threaded element 42 extending downwardly into main member 14 to releasably retain the hitch-ball in socket 40 when unit 10 is coupled to a towing vehicle or the like.

Front steering skate component 38 includes an elongated element 44 provided with a pair of transversely arcuate ears 46 secured to one end thereof and adapted to embrace the forwardmost part of main member 14 rearwardly of socket 40, with bolt and nut means 48 extending through ears 46 and main member 14 serving to releasably connect the normally rearmost extremity of element 44 to main member 14. A hitch type ball 50, secured to the outer surface of element 44 and extending laterally therefrom in the same direction as ears 46, is adapted to be received within socket 40 of main member 14 and thereby additionally interconnects element 44 and main member 14.

A collar 52 integral with the end of element 44 remote from ears 46 is positioned with the axis thereof perpendicular to the longitudinal length of element 44, and is adapted to receive an elongated shaft 54 forming a part of front skate 56. As best shown in FIGS. 2 and 3, skate 56 includes a relatively flat main plate 58 having a blade 60 depending therefrom and of configuration conventionally used on ice boats. Spaced bearings 62 and 64 mounted on the upper surface of main plate 58 rotatably carry a crossbar 66 extending outwardly from respective bearings 62 and 64 and having passages 68 through the outer ends thereof. It is to be understood that the inner collars of bearings 62 and 64 are secured to adjacent surfaces of crossbar 66 so that main plate 58 and blade 60 may rotate about the axis of crossbar 66, but the latter is prevented from shifting along the longitudinal axis thereof within bearings 62 and 64. Shaft 54 is secured to crossbar 66 intermediate bearings 62 and 64, and coil springs 70 and 72 are disposed in surrounding relationship to shaft 54 on opposed sides of collar 52. Stop means 74, in the nature of a nut threaded over the upper end of shaft 54, maintains coil spring 70 in compression between stop means 74 and collar 52, whereas coil spring 72 engages crossbar 66 and the lower circular edge of collar 52.

Side skate components 36, which are identical in construction except that the same are adapted to be mounted on opposed sides of frame assembly 12, each include an elongated connector 76, a sleeve 78 integral with one end thereof and adapted to be telescoped over a corresponding extremity of side members 18 and 20, an arm 80 joined to the normally outermost end of connector 76 remote from sleeve 78, and a skate broadly numerated 82 swingably coupled with the lower extremity of arm 80. As best shown in FIGS. 1 and 2, skate 82 includes a main plate 84 which is in a horizontal position when components 36 are secured to frame assembly 12, and a blade 85 depending from main plate 84 and of configuration substantially identical with that of blade 60. Opposed bearings 86 secured to main plate 84 in positions similar to those occupied by bearings 62 and 64 on main plate 58, rotatably receive stub shafts 88 extending laterally from arm 80 in opposite directions and at the lower end thereof to permit skate 82 to rotate relative to arm 80 and thereby connector 76 about the axis of shafts 88.

Sleeve 78 of each skate 36 is provided with a pair of opposed openings 90 therein which may be aligned with openings 92 in respective ends of side members 18 and 20, whereby bolt and nut means 94 may be passed through aligned openings 90 and 92 to thereby releasably secure sleeve 78 to the outer ends of side members 18 and 20.

In order to permit unit 10 to be steered from a position at the stern of boat 26 during utilization of the present unit as an ice boat, substantially T-shaped steering mechanism 96 is provided, including an upright rod 98 extending through the rearmost end of main member 14, rotatable relative thereto about the axis of upright rod 98, and maintained in a fixed position by virtue of collars 100 secured to upright rod 98 on opposed sides of main member 14. Cross-rod 102 secured intermediate the ends thereof to the lower extremity of upright rod 98 is disposed at an elevation substantially equal to that of crossbar 66 and is of approximately equal length thereto. Cables 104 interconnecting corresponding opposed ends of crossbar 66 and cross-rod 102 are disposed in passages 68 through crossbar 66 and similar passages 106 through cross-rod 102. As best indicated in FIG. 1, cables 104 are disposed in parallel relationship and are maintained in relatively taut condition in order to assure simultaneous turning of crossbar 66 and cross-rod 102 in response to rotation of upright rod 98.

Referring to FIG. 2, it is to be noted that a substantially L-shaped tiller 108 may be removably connected to the upper end of rod 98 for rotating the latter from a position within boat 26 adjacent the stern thereof. The V-shaped support 110 connected to the under-surface of main member 14 adjacent standard 30 is employed to maintain the forwardmost end of member 14 out of engagement with the ground when unit 10 is utilized as a boat trailer, as will be hereinafter set forth.

It can now be perceived that unit 10, having skate components 36 and 56 thereon, may be utilized as an ice boat on the frozen surface of a body of water, and power for propelling such ice boat may be produced by mounting a prime mover on the rear part of boat 26 and preferably the transom at the stern thereof, with such prime mover having a blade thereon in order to move the entire unit forwardly as the prime mover rotates the blade.

In the alternative, suitable sail means may be provided on boat 26 whereby wind furnishes the motive power, as with more conventional types of ice boats. During advancement of the ice boat, the same may be steered by turning tiller 108 which in turn causes cross-bar 66 to be rotated in response to swinging movement of cross-rod 102 connected to upright rod 98. Since all of the skates 82 and 56 are rotatable about horizontal axes relative to frame assembly 12, any irregularities in the surface of the ice are compensated for and precludes deleterious stresses and strains from being imparted to frame assembly 12 and in turn, boat 26. Front steering skate 56 is likewise shiftable vertically relative to main member 14 and element 44 forming a part of component 38.

When it is desired to use mobile unit 10 as a boat trailer, as illustrated in FIGS. 4 and 7, steering component 38 is removed by loosening threaded element 42 and removing bolt and nut means 48 from ears 46 and main member 14, whereby element 44 may be disconnected from the forwardmost end of main member 14. In this condition, socket 40 of main member 14 is adapted to receive the ball of a hitch connected to a suitable towing vehicle.

Additionally, bolt and nut means 94 are removed from respective sleeves 78 and the outer ends of side members 18 and 20, whereby side skate components 36 may be readily removed from frame assembly 12. Wheel and axle structures 112 are substituted for skate components 36 to thereby permit unit 10 to be towed over the surface of the ground. Each of the structures 112 includes a main arm 114 rotatably mounting a wheel 116 for rotation on a horizontal axis, it being understood that arm 114 is preferably bifurcated at the lower end thereof to accommodate a corresponding wheel 116. A pair of spaced, coaxial sleeves 118 are secured to the normally uppermost end of a respective arm 114 in spaced relationship and are adapted to be telescoped over a respective outer extremity of side members 18 and 20. A collar 120, also concentric with sleeves 118 and disposed between the same as shown in FIG. 7, is adapted to be releasably secured to a respective side member such as 20 through employment of bolt and nut means 122, whereby sleeves 118 and respective arms 114 mounting wheels 116 are free to pivot relative to a corresponding collar 120. An L-shaped bracket 124 secured to each collar 120 receives a coil spring 126 between projection 128 on each arm 114 and the upper, laterally extending leg 130 of a respective bracket 124. In this manner, arm 114 and the wheel 116 thereon on each side of frame assembly 12 may swing about the axis of side members 18 and 20 and against the action of coil spring 126. In this way, irregularities in the surface of the ground over which mobile unit 10 is towed are compensated for, and the spring action of wheel and axle structures 112 prevents boat 26, removably supported by frame assembly 12, from being damaged.

Although various modifications may be made in the structure as described above without departing from the scope of the invention, it can be recognized that the illustrated and described structure is preferred and therefore, it is intended to be limited only by the scope of the appended claims.

Having thus described the invention what is claimed as new and desired to be secured by Letters Patent is:

1. In a mobile unit, a frame assembly having means thereon adapted to support a boat in a relatively fixed position on said frame assembly and including an elongated member disposed in a normally horizontal position substantially perpendicular to the normal path of travel of the unit; tongue means secured to said frame assembly in substantially perpendicular relationship to said member and extending forwardly from said frame assembly;

a pair of side skate components each including an elongated connector having ice-engaging means thereon at one end thereof; a front steering skate component including an elongated element having ice-engaging means thereon at one end thereof, said components being disposed for imparting mobility to said frame assembly with the boat thereon over the frozen surface of a body of water; and means for releasably securing the opposite ends of said connectors to respective ends of said member to space the ice-engaging means on said connectors a substantial distance outwardly of the ends of said members and for releasably securing the opposite end of said element to said tongue means, said connectors and said element being in positions permitting the same to be readily removed, the connectors being replaceable with wheel and axle structures and the tongue means connectable to a vehicle to thereby impart mobility to said frame assembly over the surface of the ground.

2. A mobile unit as set forth in claim 1 wherein each of said side skate components includes a skate having a plate portion and a blade depending therefrom, an upright arm, means connecting the lower end of the arm to the upper face of said plate portion for rotation about a horizontal axis perpendicular to the path of travel of the unit, the corresponding connector being secured at one end thereof to the upper end of said arm in perpendicular relationship to the latter and adapted to be partially telescoped at the opposite end thereof over a corresponding end of said member forming a part of the frame assembly whereby the corresponding skate is spaced outwardly from the end of said last mentioned member, and means releasably connecting said connector to the member.

3. In a mobile unit, a frame assembly having means thereon adapted to support a boat in a relatively fixed position on said frame assembly and including an elongated member disposed in a normally horizontal position substantially perpendicular to the normal path of travel of the unit; tongue means secured to said frame assembly in substantially perpendicular relationship to said member and extending forwardly from said frame assembly; a pair of side skate components and a front steering skate component for imparting mobility to said frame assembly with the boat thereon over the frozen surface of a body of water; and means releasably securing the side skate components to respective ends of said member and the steering skate component to said tongue means and in positions permitting all of said skate components to be readily removed, the side skate components replaced with wheel and axle structures and the tongue means connected to a vehicle to thereby impart mobility to said frame assembly over the surface of the ground, said steering skate component including an elongated element releasably secured to said tongue means in parallel relationship thereto and provided with a collar at the forwardmost end thereof disposed with the axis thereof in an upright position, a front skate having a plate portion and a blade extending therefrom, a crossbar, bearing means secured to the upper surface of said plate portion and rotatably carrying said crossbar in a normally horizontal position, an upright shaft secured to said crossbar and slidably and rotatably disposed in said collar, and means limiting sliding movement of the shaft relative to said collar.

4. A mobile unit as set forth in claim 3 wherein is provided steering mechanism including an upright rod rotatably carried by the frame assembly adjacent the normally rearmost end thereof, a cross-rod secured intermediate the ends thereof to the lower extremity of said upright rod, and substantially parallel cable means interconnecting respective opposed ends of said cross-rod and said crossbar.

5. A moblie unit as set forth in claim 3 wherein said shaft extends upwardly through the collar, therebeing a stop secured to the upper end of said shaft and coil springs surrounding the shaft on opposed sides of said collar and engaging the stop and said crossbar respectively.

References Cited in the file of this patent

UNITED STATES PATENTS

| | | |
|---|---|---|
| 1,264,110 | Mallett | Apr. 23, 1918 |
| 1,346,052 | Ollivier | July 6, 1920 |
| 2,085,295 | Campbell | June 29, 1937 |
| 2,238,464 | Fletcher | Apr. 15, 1941 |
| 2,479,674 | Elliott | Aug. 23, 1949 |
| 2,636,745 | Cartwright | Apr. 28, 1953 |
| 2,723,130 | Andrews | Nov. 8, 1955 |
| 2,795,345 | Crandall | June 11, 1957 |
| 2,982,561 | O'Connor et al. | May 2, 1961 |
| 2,997,310 | Poulsen | Aug. 22, 1961 |